US012620513B2

(12) United States Patent
Park et al.

(10) Patent No.: US 12,620,513 B2
(45) Date of Patent: May 5, 2026

(54) ORIENTED ELECTRICAL STEEL SHEET AND METHOD FOR MANUFACTURING SAME

(71) Applicant: POSCO, Pohang-si (KR)

(72) Inventors: Jong-Tae Park, Pohang-si (KR);
Oh-Yeoul Kwon, Pohang-si (KR);
Woo-Sin Kim, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 945 days.

(21) Appl. No.: 17/415,818

(22) PCT Filed: Dec. 18, 2019

(86) PCT No.: PCT/KR2019/018025
§ 371 (c)(1),
(2) Date: Jun. 18, 2021

(87) PCT Pub. No.: WO2020/130639
PCT Pub. Date: Jun. 25, 2020

(65) Prior Publication Data
US 2022/0051836 A1      Feb. 17, 2022

(30) Foreign Application Priority Data

Dec. 19, 2018    (KR) ........................ 10-2018-0165644

(51) Int. Cl.
*H01F 1/18*          (2006.01)
*B23K 26/364*       (2014.01)
(Continued)

(52) U.S. Cl.
CPC ............. *H01F 1/18* (2013.01); *B23K 26/364* (2015.10); *C21D 8/0273* (2013.01);
(Continued)

(58) Field of Classification Search
CPC ........ B23K 26/364; C21D 10/005; H01F 1/18
See application file for complete search history.

(56) References Cited

U.S. PATENT DOCUMENTS

| | | | |
|---|---|---|---|
| 4,904,312 A | 2/1990 | Beckley et al. | |
| 2013/0087249 A1 | 4/2013 | Takenaka et al. | |
| 2018/0010206 A1* | 1/2018 | Kwon ................. | C21D 8/1244 |

FOREIGN PATENT DOCUMENTS

| | | |
|---|---|---|
| CN | 102941413 A | 2/2013 |
| CN | 104726760 A | 6/2015 |

(Continued)

OTHER PUBLICATIONS

Extended European Search Report dated Feb. 3, 2022 issued in European Patent Application No. 19898832.1.

(Continued)

*Primary Examiner* — Maria V Ewald
*Assistant Examiner* — Ethan Weydemeyer
(74) *Attorney, Agent, or Firm* — Morgan Lewis & Bockius LLP

(57) ABSTRACT

A manufacturing method of a grain-oriented electrical steel sheet according to an embodiment of the present invention includes producing a cold-rolled plate; forming a groove in the cold-rolled plate; performing primary recrystallization annealing to the cold-rolled plate; and applying an annealing separator to the primary-recrystallized cold-rolled plate and performing secondary recrystallization annealing, wherein a weight ratio of $SiO_2/Fe_xSiO_y$ of the surface layer part of the cold-rolled plate is 0.3 to 3 after the primary recrystallization annealing of the cold-rolled plate. (Here, x is an integer from 1 to 2, and y is an integer from 2 to 4.)

4 Claims, 3 Drawing Sheets

(51) Int. Cl.

| | |
|---|---|
| *C21D 8/0247* | (2026.01) |
| *C21D 8/12* | (2026.01) |
| *C21D 8/1216* | (2026.01) |
| *C21D 8/1244* | (2026.01) |
| *C21D 8/1277* | (2026.01) |
| *C21D 10/00* | (2006.01) |
| *H01F 27/245* | (2006.01) |
| *H01F 41/02* | (2006.01) |

(52) U.S. Cl.
CPC ......... *C21D 8/1233* (2013.01); *C21D 8/1272* (2013.01); *C21D 8/1283* (2013.01); *C21D 10/005* (2013.01); *C21D 2201/05* (2013.01); *H01F 27/2455* (2013.01); *H01F 41/024* (2013.01)

(56) References Cited

FOREIGN PATENT DOCUMENTS

| | | |
|---|---|---|
| CN | 107109511 A | 8/2017 |
| EP | 3239324 A1 | 11/2017 |
| EP | 3239325 A1 | 11/2017 |
| JP | H10-152780 A | 6/1998 |
| JP | H11-243005 A | 9/1999 |
| JP | H11-279644 A | 10/1999 |
| JP | 2004-238734 A | 8/2004 |
| JP | 2009-134009 A | 6/2009 |
| JP | 2013-036121 A | 2/2013 |
| JP | 5234222 B2 | 7/2013 |
| JP | 2016-145419 A | 8/2016 |
| JP | 2016-532776 A | 10/2016 |
| JP | 2016-536460 A | 11/2016 |
| JP | 2017-095745 A | 6/2017 |
| JP | 2017-145506 A | 8/2017 |
| JP | 2018-508647 A | 3/2018 |
| KR | 1993-0004850 B1 | 6/1993 |
| KR | 10-2008-0010454 A | 1/2008 |
| KR | 101382645 B1 | 4/2014 |
| KR | 10-2014-0092467 A | 7/2014 |
| KR | 10-2016-0078242 A | 7/2016 |
| KR | 10-2016-0078247 A | 7/2016 |
| KR | 101693516 B1 | 1/2017 |
| KR | 101719231 B1 | 4/2017 |
| KR | 101751525 B1 | 7/2017 |
| KR | 10-2018-0073306 A | 7/2018 |
| KR | 10-2018-0073343 A | 7/2018 |
| KR | 101884429 B1 | 8/2018 |
| KR | 101892226 B1 | 8/2018 |
| KR | 10-2020-0076501 A | 6/2020 |
| KR | 102221606 B1 | 2/2021 |
| WO | 2012/164746 A1 | 12/2012 |
| WO | 2016/105053 A1 | 6/2016 |

OTHER PUBLICATIONS

Indian Office Action dated Mar. 22, 2022 issued in Indian Patent Application No. 202137031710 (with English translation).

Written Opinion and International Search Report dated Apr. 14, 2020 issued in International Patent Application No. PCT/KR2019/018025 (with English translation).

Chinese Office Action dated Apr. 20, 2023 issued in Chinese Patent Application No. 201980084800.7.

Chinese Search Report dated Mar. 30, 2023 issued in Chinese Patent Application No. 201980084800.7.

Japanese Office Action dated Jul. 31, 2024 issued in Japanese Patent Application No. 2021-636313.

K. Sato, et al., "Heat-Proof Domain-Refined Grain-Oriented Electrical Steel," Kawasaki Steel GIHO, vol. 29, No. 3, 1997 (partial English translation).

Japanese Office Action dated Feb. 14, 2025 issued in Japanese Patent Application No. 2021-536313.

M. das Gracas, et al., "Effect of the temperature and dew point of the decarburization process on the oxide subscale of a 3% silicon steel," Journal of Magnetism and Magnetic Materials, vol. 254-255, 2003, pp. 337-339.

Y. Huh, et al., "Formation mechanism and microstructure of a forsterite film in grain-oriented electrical steel," Thin Solid Films, vol. 752, 2022, 139258.

G. M. M. Cesar, et al., "Effect of Sn on the oxide subscale structure formed on a 3% Si steel," AIP Advances, vol. 8, 2018.

* cited by examiner

ORIENTED ELECTRICAL STEEL SHEET AND METHOD FOR MANUFACTURING SAME

CROSS-REFERENCE OF RELATED APPLICATIONS

This application is the U.S. National Phase under 35 U.S.C. § 371 of International Patent Application No. PCT/KR2019/018025, filed on Dec. 18, 2019, which in turn claims the benefit of Korean Application No. 10-2018-0165644, filed on Dec. 19, 2018, the entire disclosures of which applications are incorporated by reference herein.

TECHNICAL FIELD

The present disclosure relates to a grain-oriented electrical steel sheet and a manufacturing method thereof. More specifically, it relates to a grain-oriented electrical steel sheet in which magnetism is improved by controlling a weight ratio of $SiO_2/Fe_xSiO_y$ to properly form an island after primary recrystallization annealing, and a manufacturing method thereof.

BACKGROUND ART

Since a grain-oriented electrical steel sheet is used as an iron core material of an electrical device such as a transformer, in order to improve energy conversion efficiency thereof by reducing power loss of the electrical device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

As a method for lowering the iron loss of the grain-oriented electrical steel sheet, a magnetic domain refining method is known. In other words, it is to reduce the size of a large magnetic domain of the grain-oriented electrical steel sheet by scratching or applying an energy impact to the magnetic domain. In this case, when the magnetic domain is magnetized and the direction thereof is changed, energy consumption may be reduced compared to when the size of the magnetic domain is large. As the magnetic domain refining method, there are permanent magnetic domain refining, in which magnetic characteristics are improved even after a heat treatment, and the effect is maintained, and a temporary domain refining, which is not.

The permanent magnetic domain refining method, which shows the effect of improving the iron loss even after a stress relief heat treatment above the heat treatment temperature at which the recovery occurs, may be divided into an etching method, a roll method, and a laser method. Since it is difficult to control a groove shape because the grooves are formed on the surface of the steel sheet by a selective electrochemical reaction in a solution, it is difficult to uniformly secure the iron loss characteristics of the final product in the width direction. In addition, an acid solution used as a solvent has a disadvantage that it is not environmentally friendly.

The method of refining the permanent magnetic domain using a roll is a technology of magnetic domain miniaturization partially generating recrystallized particles under the groove by forming and then annealing a groove having a constant width and depth on the surface of the plate by processing a protrusion shape on the roll to be pressed by the roll or the plate. The roll method is disadvantageous in stability in machine processing, reliability to obtain stable iron loss depending on the thickness, and process complexity, and deterioration of the iron loss and the magnetic flux density characteristics immediately after the groove formation (before the stress relaxation annealing).

The permanent magnetic domain miniaturizing method by the laser uses a method of irradiating a high power laser to the surface part of the electrical steel plate and forming a groove accompanying fusion of a supporting part by the laser irradiation. However, with this permanent magnetic domain refinement method, it is also difficult to refine the magnetic domain to the minimum size.

In the case of the temporary domain refinement, the laser is not irradiated with higher intensity than a certain level because research is being performed in a direction of not applying the coating once more after applying the laser in the coated state. This is because it is difficult to properly exert the tension effect due to the damage of the coating if the laser is applied over a certain level.

In the case of the permanent magnetic domain refining, the groove is dug to widen the free charge area that may receive static magnetism, so the deepest groove depth is required. Of course, side effects such as a deterioration of the magnetic flux density also occur due to the deeper groove depth. Therefore, in order to reduce the deterioration of the magnetic flux density, it is managed with an appropriate groove depth.

DISCLOSURE

An embodiment of the present invention provides a grain-oriented electrical steel sheet and a manufacturing method thereof.

In detail, an embodiment of the present invention is to provide a grain-oriented electrical steel sheet in which magnetism is improved by controlling a weight ratio of $SiO_2/Fe_xSiO_y$ to properly form an island after primary recrystallization annealing, and a manufacturing method thereof.

A grain-oriented electrical steel sheet according to an embodiment of the present invention includes a groove positioned in a surface of an electrical steel sheet surface; a metal oxide layer positioned on the groove; and a discontinuously distributed metal oxide-based island positioned below the groove, wherein the density of islands positioned below the groove is 15 or less per groove.

The number of the islands positioned below the groove may be 15 or less per groove.

The density of the islands positioned under the groove may be 0.5 islands/$\mu m^2$ or less.

Among the islands positioned under the groove, the number of islands with sphericity of 0.6 to 1.0 may be 60% or more.

The grooves may be intermittently formed at 2 to 10 for the rolled vertical direction.

The length direction of the groove and the rolled direction of the steel sheet may form an angle of 75 to 88°.

A manufacturing method of a grain-oriented electrical steel sheet according to an embodiment of the present invention includes producing a cold-rolled plate; forming a groove in the cold-rolled plate; performing primary recrystallization annealing to the cold-rolled plate; and applying an annealing separator to the primary-recrystallized cold-rolled plate and performing secondary recrystallization annealing, wherein a weight ratio of $SiO_2/Fe_xSiO_y$ of the surface layer part of the cold-rolled plate is 0.3 to 3 after the primary recrystallization annealing of the cold-rolled plate.

(Here, x is an integer from 1 to 2, and y is an integer from 2 to 4.)

In the forming of the groove, a laser is irradiated to the cold-rolled plate to form the groove, a laser output may be 1.5 kW or more, a laser scanning speed may be 8 m/s or more, and a laser scanning distance may be 100 mm or more.

In the forming of the groove, a re-solidification layer may be formed at the lower part of the groove.

In the forming of the groove, a re-solidification layer may be formed with a thickness of 3 μm or less at the lower part of the groove.

The primary recrystallization annealing of the cold-rolled plate may be performed at a temperature of 710 to 870° C. and a dew point temperature of 40 to 70° C.

According to an embodiment of the present invention, after the primary recrystallization annealing, by controlling the weight ratio of the $SiO_2/Fe_xSiO_y$ to appropriately form the island, the magnetism may be improved.

MODE FOR INVENTION

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section described below could be termed a second element, component, region, layer, or section without departing from the teachings of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and "comprising", when used in this specification, specify the presence of stated features, integers, steps, operations, elements, and/or components, but do not preclude the presence or addition of one or more other features, integers, steps, operations, elements, components, and/or groups.

It will be understood that when an element such as a layer, film, region, or substrate is referred to as being "on" or "above" another element, it can be directly on or above the other element or intervening elements may also be present. In contrast, when an element is referred to as being "directly on" another element, there are no intervening elements therebetween.

If not defined differently, all the terminologies including the technical terminologies and scientific terminologies used herein have meanings that are the same as ones that those skilled in the art generally understand. The terms defined in dictionaries should be construed as having meanings corresponding to the related prior art documents and those stated herein, and are not to be construed as being idealized or official, if not so defined.

Hereinafter, embodiments of the present invention will be described in detail so as to be easily practiced by a person skilled in the art to which the present invention pertains. As those skilled in the art would realize, the described embodiments may be modified in various different ways, all without departing from the spirit or scope of the present invention.

Figure 1:
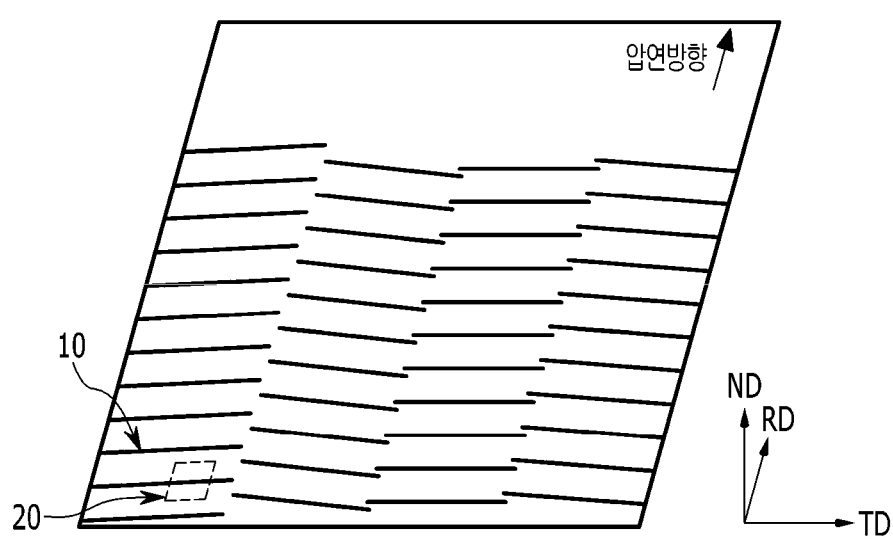
FIG. 1 is a schematic view of a rolled surface (an ND surface) of a grain-oriented electrical steel sheet according to an embodiment of the present invention.

FIG. 1 shows a schematic view of a grain-oriented electrical steel sheet 10 that is refined with a magnetic domain according to an embodiment of the present invention.

As shown in FIG. 1, the grain-oriented electrical steel sheet 10 according to an embodiment of the present invention includes a groove 20 of a line shape formed in a direction crossing a rolled direction (an RD direction) on one surface or both surfaces of the electrical steel sheet.

Hereinafter, each step is described in detail.

First, a cold-rolled plate is manufactured. In an embodiment of the present invention, after manufacturing the cold-rolled plate, as a characteristic of the magnetic domain refining method, the cold-rolled plate used in the field of the grain-oriented electrical steel sheet may be used without limitation as a cold-rolled plate to be subjected to the magnetic domain refining. Particularly, the effect of the present invention is expressed regardless of the alloy composition of the grain-oriented electrical steel sheet. Accordingly, the detailed description for the alloy composition of the grain-oriented electrical steel sheet is omitted. As an example, the cold-rolled plate may include, as wt %, C: 0.10% or less, Si: 2.0 to 6.5%, Mn: 0.005 to 1.0%, Nb+V+Ti: 0.02% or less, Cr+Sn: 0.8% or less, Al 3.0% or less, P+S: 0.09% or less, and a total amount of a rare earth and other impurities is 0.5% or less, and the remainder Fe.

For the cold-rolled plate manufacturing method, a cold-rolled plate manufacturing method used in the field of the grain-oriented electrical steel sheet may be used without limitation and the detailed description is omitted.

Next, a groove is formed on the cold-rolled plate.

In the forming of the groove, two to ten grooves may be formed intermittently in the rolled vertical direction. FIG. 1 shows an example that four grooves are formed intermittently in the rolled vertical direction. However, is not limited thereto, and it is also possible to continuously form the groove.

Figure 2:
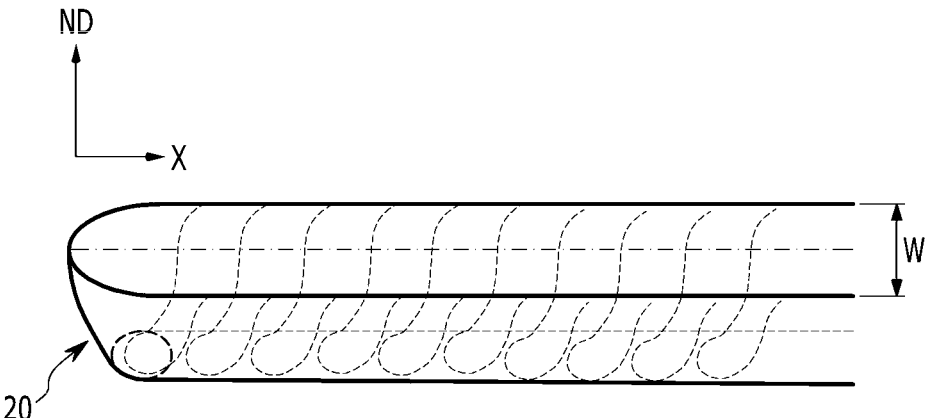
FIG. 2 is a schematic view of a groove according to an embodiment of the present invention.

As shown in FIG. 1 and FIG. 2, the length direction (the RD direction of FIG. 1, the X direction of FIG. 2) of the groove 20 and the rolled direction (the RD direction) may form an angle of 75 to 88°. When the groove 20 is formed at the above-described angle, it may contribute to improving the iron loss of the grain-oriented electrical steel sheet.

The width W of the groove may be 10 to 200 μm. If the width of groove 20 is smaller or larger than this, it may not be possible to obtain an appropriate magnetic domain refining effect.

Also, a depth H of the groove may be 30 μm or less. If the depth H of the groove is too deep, the structural characteristic of the steel sheet 10 may be greatly changed due to the strong laser irradiation, or a large amount of a heel-up and spatter may be formed, thereby deteriorating the magnetism. Therefore, the depth of groove 20 may be controlled within the above-described range. In detail, the depth of the groove may be 3 to 30 μm.

In the step of forming the groove, a laser or plasma may be irradiated to the cold-rolled plate to form the groove.

When using a laser, the laser output is 1.5 kW or more, the laser scanning speed is 8 m/s or more, and the laser scanning distance may be 100 mm or more By using an appropriate output, scanning speed, and scanning distance, the re-solidification layer may be properly formed under the groove. This leads to the content of the components in the surface layer after the primary recrystallization annealing, and ultimately helps to improve the iron loss. More specifically, the laser output may be 1.5 to 10 kW, the laser scanning speed may be 8 to 15 m/s, and the laser scanning distance may be 100 to 200 mm.

A laser oscillation method may be used without limitation. That is, continuous oscillation or a pulsed mode may be used. In this way, the laser is irradiated so that the surface beam absorption rate may be more than fusion heat of the steel sheet, and the groove 20 represented in FIG. 1 and FIG. 2 is formed. The X direction in FIG. 2 represents the length direction of the groove 20.

In this way, when using the laser or the plasma, the re-solidification layer may be formed under the groove by the heat emitted from the laser or the plasma. The re-solidification layer is distinguished by the difference in the overall structure and the grain size of the electrical steel sheet during manufacture. The thickness of the re-solidification layer may be formed to be 3 μm or less. If the thickness of the re-solidification layer is too thick, it may affect the weight ratio of $SiO_2/Fe_xSiO_y$ of the surface layer part of the cold-rolled plate to be described later, so that the magnetism may be deteriorated. In detail, the thickness of the re-solidification layer may be 0.1 to 3 μm.

After the step of forming the groove, a step of removing the spatter or heel-up formed on the cold-rolled plate surface may be further included.

Next, the cold-rolled plate is annealed through primary recrystallization.

Since the step of the primary recrystallization annealing is widely known in the field of grain-oriented electrical steel sheets, the detailed description thereof is omitted. The primary recrystallization annealing process may include decarburization, or decarburization and nitridation, and the annealing may be performed in a humid atmosphere for decarburization, or decarburization and nitridation. The soaking temperature at the stage of the primary recrystallization annealing may be 710 to 870° C. Also, the dew point temperature may be 40 to 70° C.

In an embodiment of the present invention, by the control of the weight ratio of $SiO_2/Fe_xSiO_y$ of the surface layer part of the cold-rolled plate, the iron loss may be improved. In detail, the weight ratio of $SiO_2/Fe_xSiO_y$ of the surface layer part of the cold-rolled plate may be 0.3 to 3. If it is out of the above range, a large number of islands are generated in the lower part of the groove after the secondary recrystallization annealing, which may adversely affect the magnetism.

The surface layer part means the thickness to 1 to 2 μm from the steel plate surface.

The weight ratio of $SiO_2/Fe_xSiO_y$ may be measured by an FT-IR method.

Next, an annealing separator is applied, and the secondary recrystallization annealing is performed. Since the annealing separator is widely known, a detailed description is omitted. As an example, an annealing separator having MgO as a main component may be used.

The purpose of the secondary recrystallization annealing is forming {110}<001> texture by the secondary recrystallization, providing insulation by forming a metal oxide (vitreous) film by the reaction of the oxide layer formed during primary recrystallization annealing and MgO, and removal of impurities that harm the magnetic characteristics. As the method of secondary recrystallization annealing, in the heating section before the secondary recrystallization occurs, a mixed gas of nitrogen and hydrogen is maintained to protect a nitride as a particle growth suppressor, so that the secondary recrystallization may be developed well, and after the secondary recrystallization is completed, in the soaking step, a 100% hydrogen atmosphere is maintained for a long time to remove the impurities.

The secondary recrystallization annealing may be performed in the soaking temperature of 900 to 1210° C.

Figure 3:
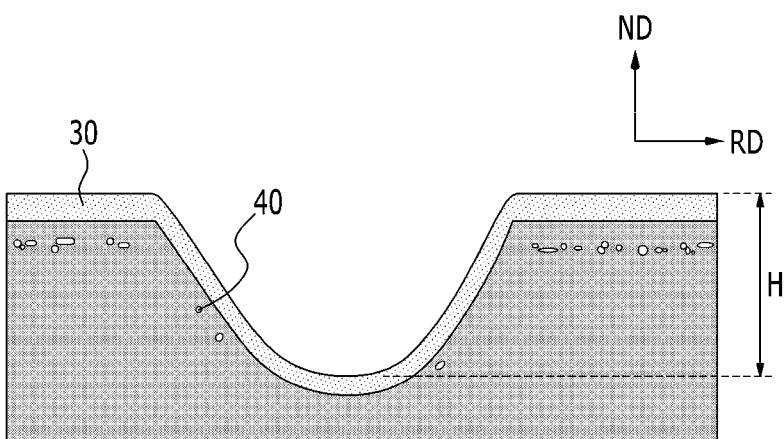
FIG. 3 is a schematic view of a cross-section of a groove according to an embodiment of the present invention.

In the secondary recrystallization annealing process, the MgO component in the annealing separator may react with the oxide layer formed on the surface of the steel plate to form a metal oxide layer (a forsterite layer) on the surface of the steel plate and the groove. In FIG. 3, the metal oxide layer 30 is represented schematically. In an embodiment of the present invention, since the groove is formed before the secondary recrystallization annealing, the metal oxide layer 30 may be formed on the surface of the groove as well as the steel plate.

In an embodiment of the present invention, after the primary recrystallization, by appropriately controlling the weight ratio of $SiO_2/Fe_xSiO_y$ of the surface layer part, MgO in the annealing separator penetrates or passes through the inside of the steel plate, thereby forming the island 40 under the metal oxide layer 30. This island 40 includes the metal oxide. More specifically, the forsterite is included.

In FIG. 3, the island 40 is represented schematically. As shown in FIG. 3, the island 40 may be formed while separating from the metal oxide layer 30.

By properly forming the island 40 discontinuously, it may contribute to improving the magnetism.

More specifically, the island 40 may have a density of 15 or less per groove. FIG. 3 shows an example in which three islands 40 are formed in the lower part of the groove. That is, the density is three per groove. More specifically, the island 40 may have density of 3 to 15 per groove. More specifically, it may be 10 to 15 islands per groove.

The density of the islands positioned under the groove may be less than 0.5/μm².

In this case, a standard means the density of the islands per groove for the area within 5 μm below the groove in the cross-section (a TD plane) including the rolled direction (the RD direction) and the thickness direction (the ND direction) of the steel sheet.

Among the islands 40 positioned under the groove 20, the number of islands with sphericity (a shortest axis/a longest axis) of 0.6 to 1.0 is 60% or more. At this time, the standard is the cross-section (the TD surface) including the steel sheet rolled direction (the RD direction) and the thickness direction (the ND direction). In addition, the island 40 positioned below the surface where the groove 20 is not formed is excluded from the above-mentioned distribution calculation. In other words, the islands with sphericity (a shortest axis/a longest axis) of 0.6 or less among the islands 40 positioned under the groove 20 is less than 30%. More specifically, the islands with sphericity (a shortest axis/a longest axis) 0.6 to 1.0 among the islands 40 positioned under the groove 20 is 60 to 90%. More specifically, the islands with sphericity (a shortest axis/a longest axis) 0.6 to 1.0 among the islands 40 positioned under the groove 20 is 70 to 80%.

After the secondary recrystallization annealing, forming an insulating coating layer on the metal oxide layer may be further included.

A method of forming the insulating coating layer may be used without particular limitation, and, for example, the insulating coating layer may be formed by applying an insulating coating solution containing a phosphate. It is preferable to use a coating solution including colloidal silica and a metal phosphate as the insulating coating solution. At this time, the metal phosphate may be Al phosphate, Mg phosphate, or a combination thereof, and the content of Al, Mg, or a combination thereof relative to the weight of the insulating coating solution may be 15 wt % or more.

The grain-oriented electrical steel sheet according to an embodiment of the present invention includes the groove 20 positioned at the surface of the electrical steel sheet 10, the metal oxide layer 30 positioned on the groove 20, and the island 40 positioned under the groove.

The island 40 may have the density of 15 or less per the groove. More specifically, the island 40 may have density of 3 to 15 per groove. More specifically, it may be 10 to 15 islands per groove. If the density per groove exceeds 15, the magnetism deteriorates.

Among the islands 40 positioned below the groove, the number of islands with sphericity (a shortest axis/a longest axis) of 0.6 to 1.0 among the islands 40 positioned under the groove 20 is more than 60%. By properly forming the island 40, the magnetism may be improved. More specifically, the islands with sphericity (a shortest axis/a longest axis) 0.6 to 1.0 among the islands 40 positioned under the groove 20 is 60 to 90%. More specifically, the islands with sphericity (a shortest axis/longest axis) 0.6 to 1.0 among the islands 40 positioned under the groove 20 is 70 to 80%.

Hereinafter, the present invention is described in more detail through an embodiment. However, these embodiments are merely for illustrating the present invention, and the present invention is not limited thereto.

Embodiments

A cold-rolled plate with a thickness of 0.23 mm was prepared. This cold-rolled plate was irradiated with a continuous wave laser of A 2.0 k W Gaussian mode at a scanning speed of 10 m/s and a scanning distance of 150 mm to form a groove at an angle of 85° with the RD direction. After that, the primary recrystallization annealing was carried out, and the secondary recrystallization was performed after applying a MgO annealing separator. After that, an insulating coating layer was formed.

After the primary recrystallization annealing, the weight ratio of $SiO_2/Fe_xSiO_y$ on the surface part was measured and is shown in Table 1, and the island density at the lower part of the groove was measured and is shown in Table 1. In addition, the iron loss (W17/50) was measured and is shown in Table 1 below.

TABLE 1

| Division | $SiO_2/Fe_xSiO_y$, weight ratio of surface layer part | Island density (number/per groove) | Iron loss W17/50, (W/kg) |
|---|---|---|---|
| Embodiment 1 | 0.3 | 5 | 0.74 |
| Embodiment 2 | 0.5 | 10 | 0.72 |
| Embodiment 3 | 0.7 | 5 | 0.71 |
| Embodiment 4 | 0.4 | 12 | 0.72 |
| Embodiment 5 | 1.2 | 15 | 0.71 |

8

TABLE 1-continued

| Division | $SiO_2/Fe_xSiO_y$, weight ratio of surface layer part | Island density (number/per groove) | Iron loss W17/50, (W/kg) |
|---|---|---|---|
| Embodiment 5 | 1.8 | 9 | 0.73 |
| Embodiment 6 | 1.1 | 8 | 0.73 |
| Embodiment 7 | 2.3 | 11 | 0.72 |
| Embodiment 8 | 3.0 | 15 | 0.71 |
| Embodiment 9 | 2.7 | 11 | 0.72 |
| Embodiment 10 | 3.5 | 17 | 0.80 |
| Comparative Example | | | |

As shown in Table 1, when the weight ratio of $SiO_2/Fe_xSiO_y$ is appropriately controlled, an appropriate number of the islands are formed, and it may be confirmed that the iron loss is excellent. On the other hand, in the comparative example in which the weight ratio of $SiO_2/Fe_xSiO_y$ is not properly controlled, it may be confirmed that a large amount of the islands are produced so that the magnetism is relatively poor.

Also, in the embodiments 1 to 10, it was confirmed that the number of the islands having sphericity of 0.6 to 1.0 among the islands positioned in the lower part of the groove is 50% or more, respectively, and the density of the islands positioned in the lower part of the groove is 15 or less.

On the other hand, in the comparative example, it was confirmed that the number of the islands with sphericity of 0.6 to 1.0 among the islands positioned under the groove is less than 50%, and the density of the islands positioned under the groove exceeds 15.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only and the scope of the present invention is not limited thereto.

DESCRIPTION OF SYMBOLS

10: grain-oriented electrical steel sheet,
20: groove,
30: metal oxide layer,
40: island

The invention claimed is:

1. A grain-oriented electrical steel sheet comprising:
a groove positioned in a surface of an electrical steel sheet surface;
a metal oxide layer positioned on the groove; and
a discontinuously distributed metal oxide-based island positioned below the groove, the discontinuously distributed metal oxide-based island comprising a plurality of islands,
wherein the density of the plurality of islands positioned below the groove is 3 to 15 per groove, and
wherein the density of the plurality of islands positioned under the groove is 0.5 islands/$\mu m^2$ or less, wherein at least one of the plurality of islands overlaps the groove in a thickness direction of the electrical steel sheet.

2. The grain-oriented electrical steel sheet of claim 1, wherein:

among the plurality of islands positioned under the groove, the number of islands with sphericity of 0.6 to 1.0 is 60% or more.

3. The grain-oriented electrical steel sheet of claim 1, wherein:

the groove includes 2 to 10 grooves intermittently formed in a direction perpendicular to a rolled direction.

4. The grain-oriented electrical steel sheet of claim 1, wherein:

the length direction of the groove and a rolled direction of the steel sheet form an angle of 75 to 88°.

\* \* \* \* \*